May 4, 1926.

F. A. REYNOLDS 1,583,100

MACHINE FOR PARING, CORING, AND REMOVING SEED CELLS FROM APPLES

Filed June 4, 1923    14 Sheets-Sheet 1

INVENTOR.
Frank A. Reynolds
BY Harold E. Stonebraker
his ATTORNEY

May 4, 1926. 1,583,100
F. A. REYNOLDS
MACHINE FOR PARING, CORING, AND REMOVING SEED CELLS FROM APPLES
Filed June 4, 1923 14 Sheets-Sheet 2

INVENTOR.
Frank A. Reynolds
BY Harold R. Stonebraker
his ATTORNEY

May 4, 1926. 1,583,100
F. A. REYNOLDS
MACHINE FOR PARING, CORING, AND REMOVING SEED CELLS FROM APPLES
Filed June 4, 1923 14 Sheets-Sheet 3

INVENTOR.
Frank A. Reynolds
BY Harold E. Stonebraker,
his ATTORNEY

May 4, 1926.

F. A. REYNOLDS

MACHINE FOR PARING, CORING, AND REMOVING SEED CELLS FROM APPLES

Filed June 4, 1923 14 Sheets-Sheet 4

INVENTOR.
Frank A. Reynolds
BY Harold E. Stonebraker
his ATTORNEY

May 4, 1926.  
F. A. REYNOLDS  
1,583,100  
MACHINE FOR PARING, CORING, AND REMOVING SEED CELLS FROM APPLES  
Filed June 4, 1923 14 Sheets-Sheet 5

INVENTOR.  
Frank A. Reynolds  
BY Harold E. Stonebraker  
HIS ATTORNEY

May 4, 1926.

F. A. REYNOLDS 1,583,100

MACHINE FOR PARING, CORING, AND REMOVING SEED CELLS FROM APPLES

Filed June 4, 1923    14 Sheets-Sheet 7

INVENTOR.
Frank A. Reynolds
BY Harold E. Stonebraker
his ATTORNEY

May 4, 1926.
F. A. REYNOLDS
1,583,100
MACHINE FOR PARING, CORING, AND REMOVING SEED CELLS FROM APPLES
Filed June 4, 1923   14 Sheets-Sheet 8
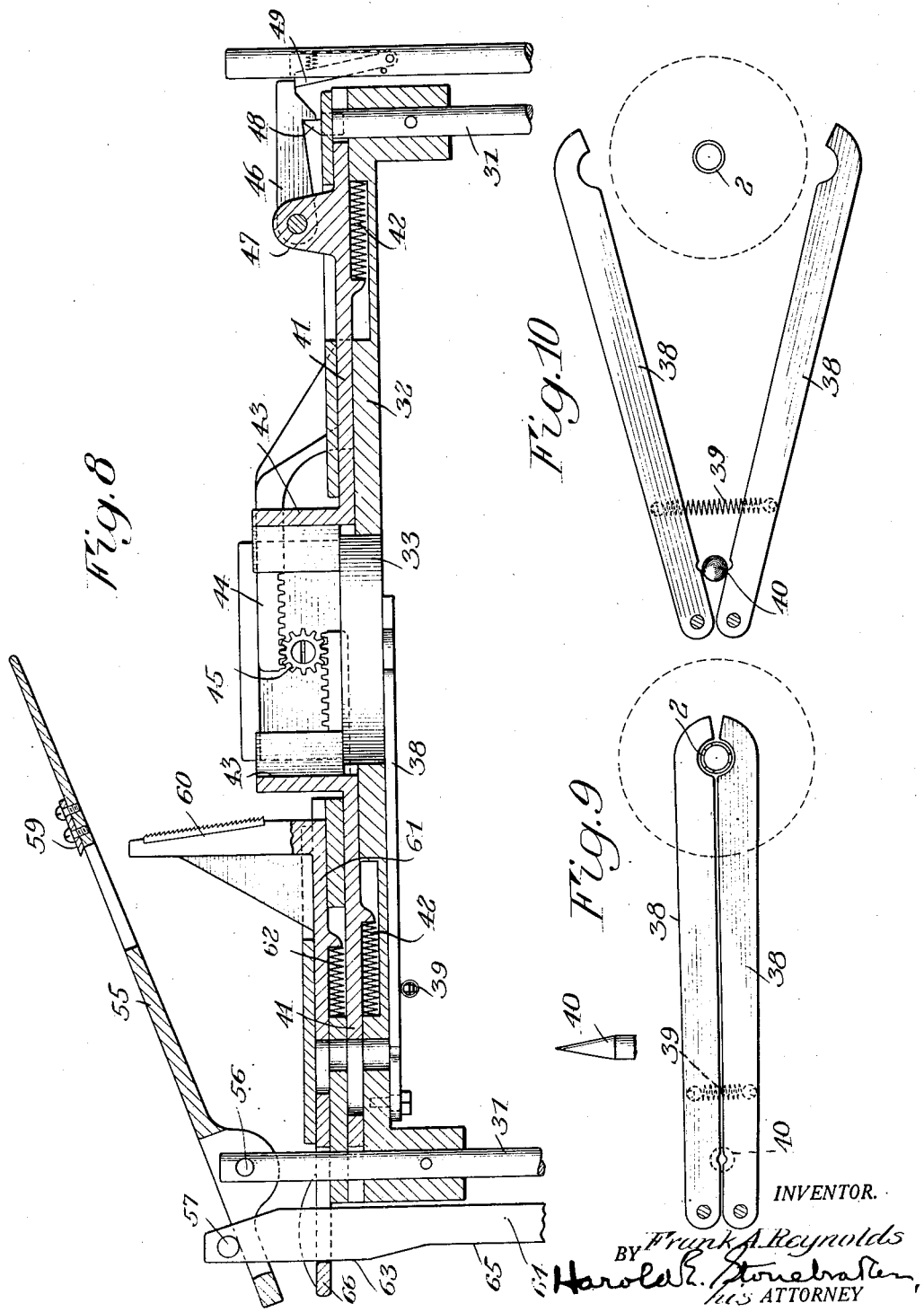
INVENTOR.
Frank A. Reynolds
BY Harold E. Stonebraker
HIS ATTORNEY May 4, 1926.
F. A. REYNOLDS
1,583,100
MACHINE FOR PARING, CORING, AND REMOVING SEED CELLS FROM APPLES
Filed June 4, 1923        14 Sheets-Sheet 9
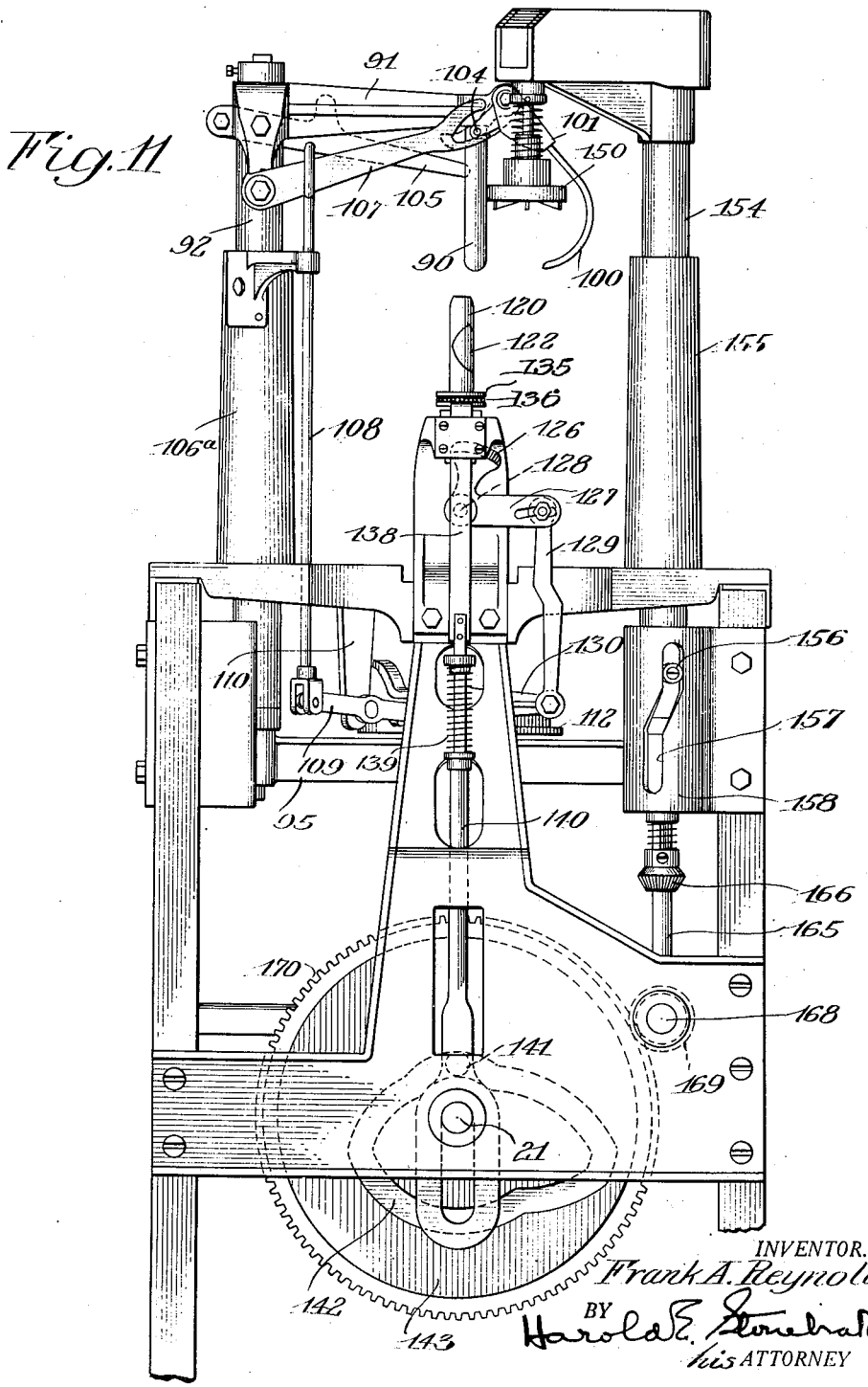

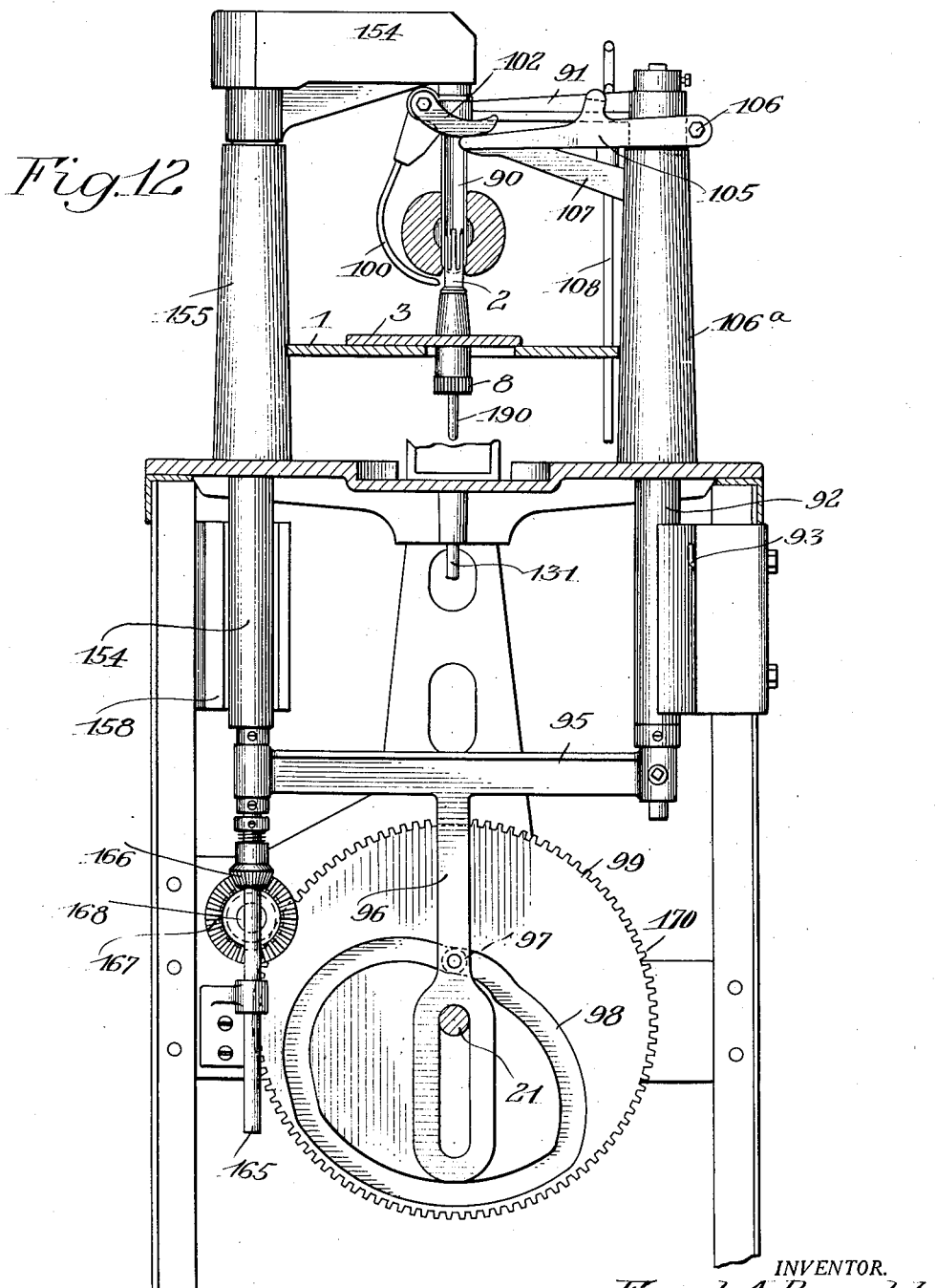

May 4, 1926.

F. A. REYNOLDS 1,583,100

MACHINE FOR PARING, CORING, AND REMOVING SEED CELLS FROM APPLES

Filed June 4, 1923  14 Sheets-Sheet 11

INVENTOR.
Frank A. Reynolds
BY Harold E. Stonebraker
his ATTORNEY

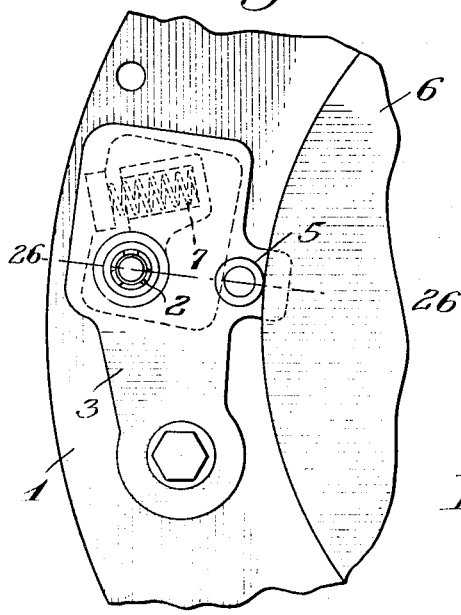
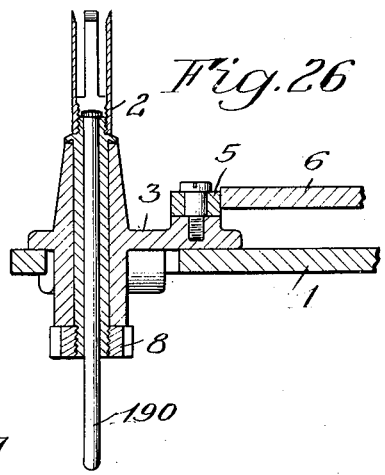
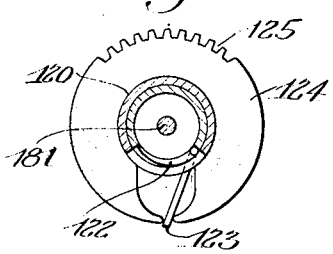
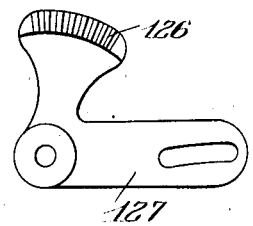
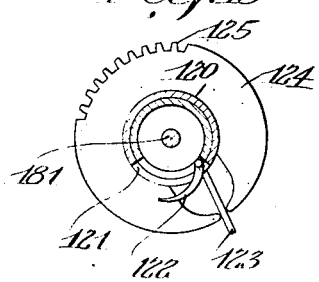
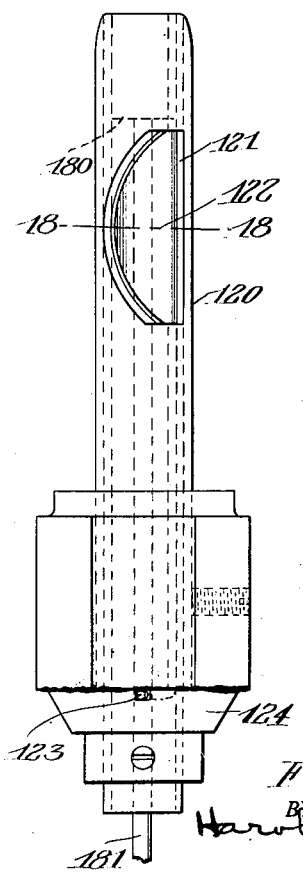

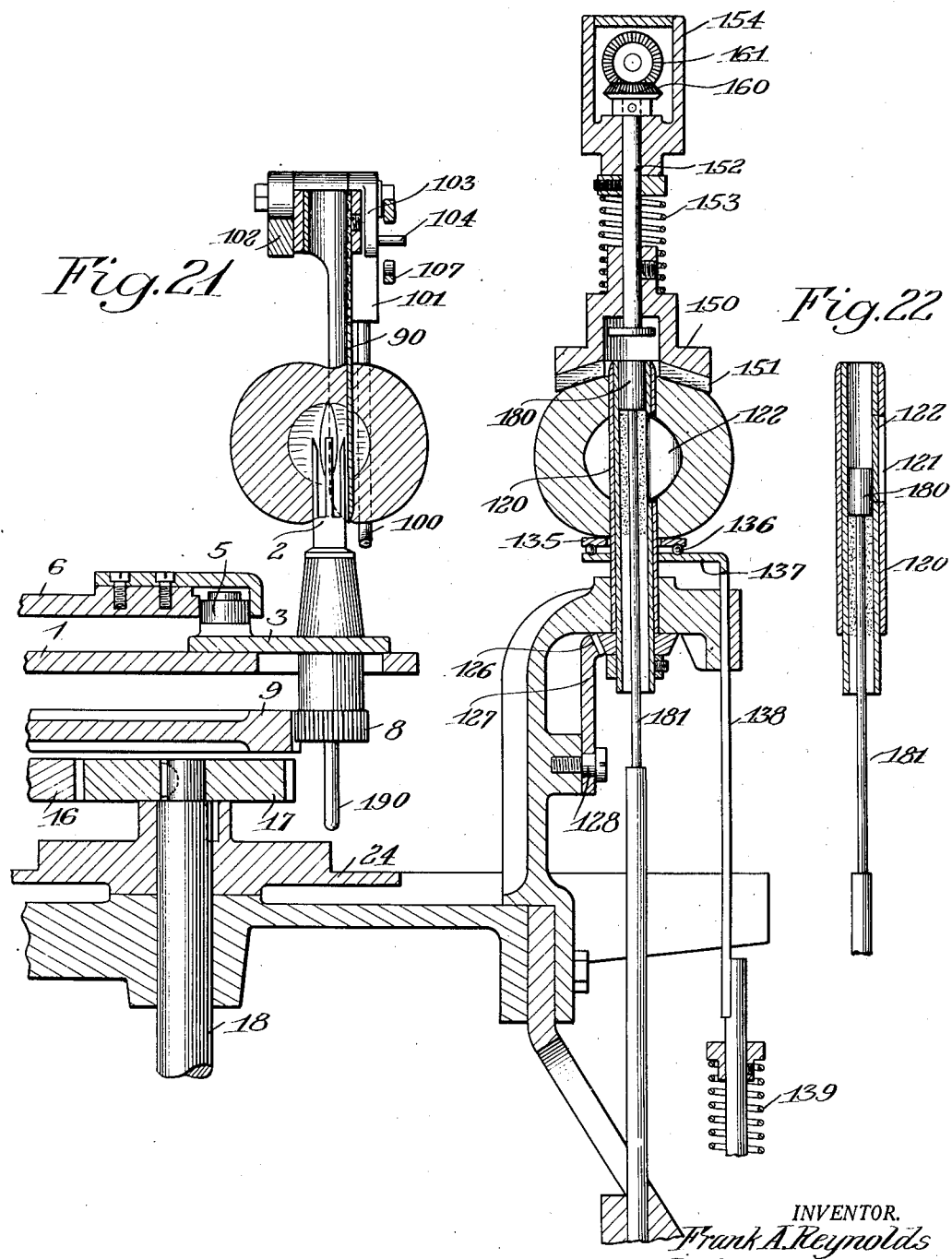

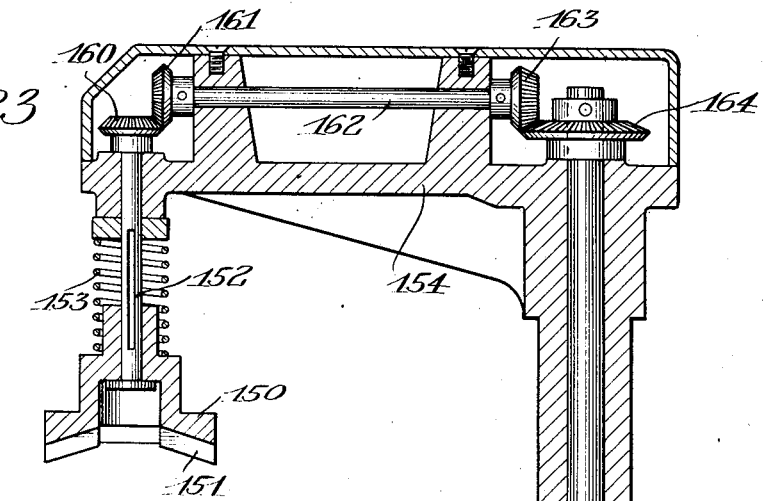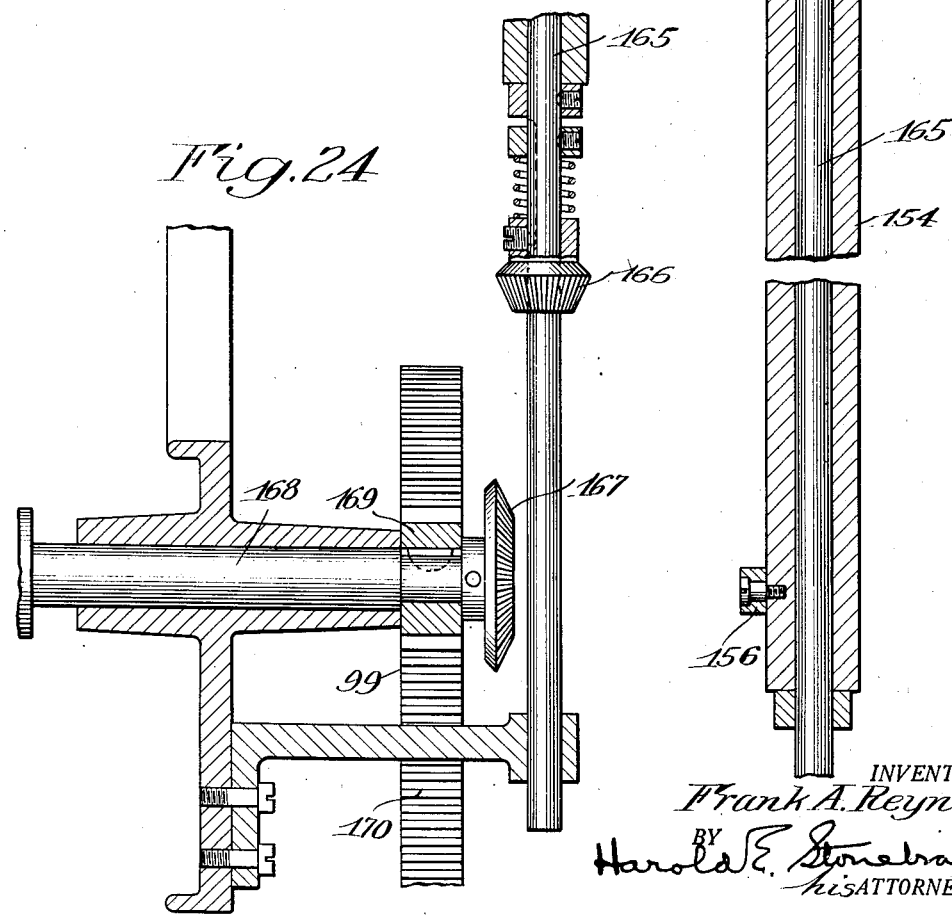

Patented May 4, 1926.

1,583,100

UNITED STATES PATENT OFFICE.

FRANK A. REYNOLDS, OF GENEVA, NEW YORK, ASSIGNOR TO REYNOLDS MANUFACTURING CORPORATION, OF GENEVA, NEW YORK, A CORPORATION OF NEW YORK.

MACHINE FOR PARING, CORING, AND REMOVING SEED CELLS FROM APPLES.

Application filed June 4, 1923. Serial No. 643,262.

*To all whom it may concern:*

Be it known that I, FRANK A. REYNOLDS, a citizen of the United States of America, residing at Geneva, in the county of Ontario and State of New York, have invented certain new and useful Improvements in Machines for Paring, Coring, and Removing Seed Cells from Apples, of which the following is a specification.

My invention relates to a machine for paring, coring and removing seed cells from apples, and has for its object to provide mechanism by which these several operations are automatically and successfully performed, the only manual operation required being that of positioning an apple on a loading mechanism.

An additional object of the invention is to afford an economical, practical and efficient arrangement of parts for removing seed cells from apples in such manner that the seed cell portion is accurately removed without unnecessarily wasting the apple, and irrespective of the size or shape of the apple operated on.

A further object of my improvement is to provide seed cell removing mechanism in which a cell removing knife is held stationery while the apple is rotated, which arrangement lends itself readily to the successful dislodgement of the seed cell mass by reason of the centrifugal action of the apple, without damaging or defacing the apple in any way, and disposing of the seed cell mass by automatically ejecting it from the machine after each operation.

Still another purpose of the invention is to combine a simple seed cell removing mechanism with an apple coring mechanism, building the entire structure from automatically and successively operating parts, so that an apple can be cored and automatically transferred to another position where its seed cells are removed, before it is ejected from the machine.

Another object of my invention is to provide simple and efficient means for holding and properly centering an apple with reference to a seed cell removing knife, so that the latter cooperates accurately with apples of different sizes.

An additional object of the invention is in the provision of a practical loading mechanism of few parts and certain in its operation, which automatically grips and positions an apple accurately on a fork on the carrier table, preliminarily to the paring and other operations.

The invention also comprehends a number of other purposes and advantages, and details of parts, all of which will appear clearly from the following description, when read in conjunction with the accompanying drawings, the novel features being pointed out in the claims following the specification.

In the drawings:

Figure 8 is a vertical sectional view on line 8—8 of Figure 1, illustrating the parts of the loading mechanism in normal position;

Figure 9 is a detail view of the platform on which the apple rests, while the loading mechanism places it on the carrier fork;

Figure 10 is a similar view of the platform illustrating the movable portions of the latter separated to release the apple;

Figure 11 is an end elevation, showing the coring mechanism and seed cell removing mechanism;

Figure 12 is a vertical sectional view illustrating the position of the parts of the coring mechanism as upon completion of the coring operation, and showing the apple about to be elevated with the coring knife;

Figure 17 is an enlarged side elevation of a portion of the seed cell removing mechanism, showing the tubular member and the seed cell removing knife;

Figure 18 is a horizontal sectional view on line 18—18 of Figure 17, illustrating the parts in normal position;

Figure 19 is a view similar to Figure 18, with the seed cell knife actuated outwardly to engage the apple;

Figure 20 is a detail side elevation of the actuator for the seed cell removing knife;

Figure 21 is a vertical sectional view, illustrating the coring and seed cell removing mechanisms in operative positions;

Figure 22 is a detail sectional view of the tubular member of the seed cell removing mechanism and the ejecting means for the seed cell mass;

Figure 23 is a vertical sectional view of the rotary head forming part of the seed cell removing mechanism, and its supporting and operating parts;

Figure 24 is an enlarged detail sectional view of a portion of the drive gearing;

Figure 25 is an enlarged plan view of a portion of the carrier table, showing the means for moving an apple retaining fork into rotative or stationary position as the case may be, and Figure 26 is a sectional view on line 26—26 of Figure 25.

My invention generally, and the various cooperating units, such as the loading, coring, and seed cell removing mechanism, may be adapted combined, or severally, to practical purposes in a variety of ways, and for convenience of illustration I have selected one complete machine embodying a practical adaptation of the various features of my invention, merely as illustrative of one of many possible embodiments.

Among the principal factors of the invention are an intermittently rotating carrier provided with a series of apple holding devices, and a loading mechanism upon which an apple is manually positioned and which automatically secures the apple on the rotary carrier. As the carrier rotates, the apple is first moved from the loading station to a paring station where it is pared, thence to a coring station, where a coring mechanism operates to remove the core, and following this the apple is automatically transferred from the carrier to a seed cell removing mechanism. When the latter mechanism has completed its operation of removing the seed cells, the operations on the apple are complete and the apple is discharged into a suitable receptacle. I will describe first the intermittently rotating carrier and the mechanism for rotating the apple holding devices while at the paring and coring stations.

Carrier table.

Figure 1:
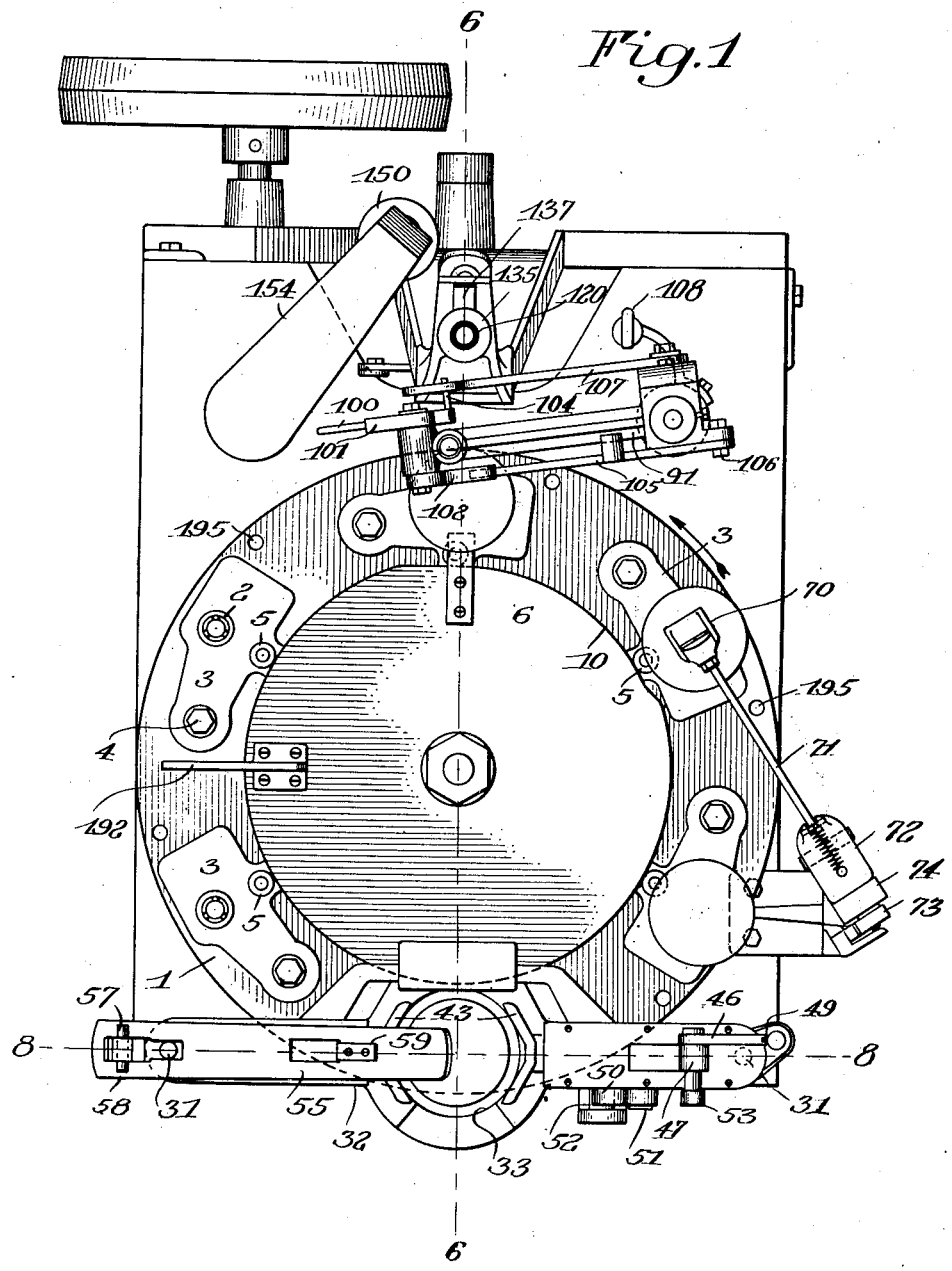
Figure 1 is a plan view of a machine incorporating the various improvements of my invention in their preferred forms.
Figure 6:
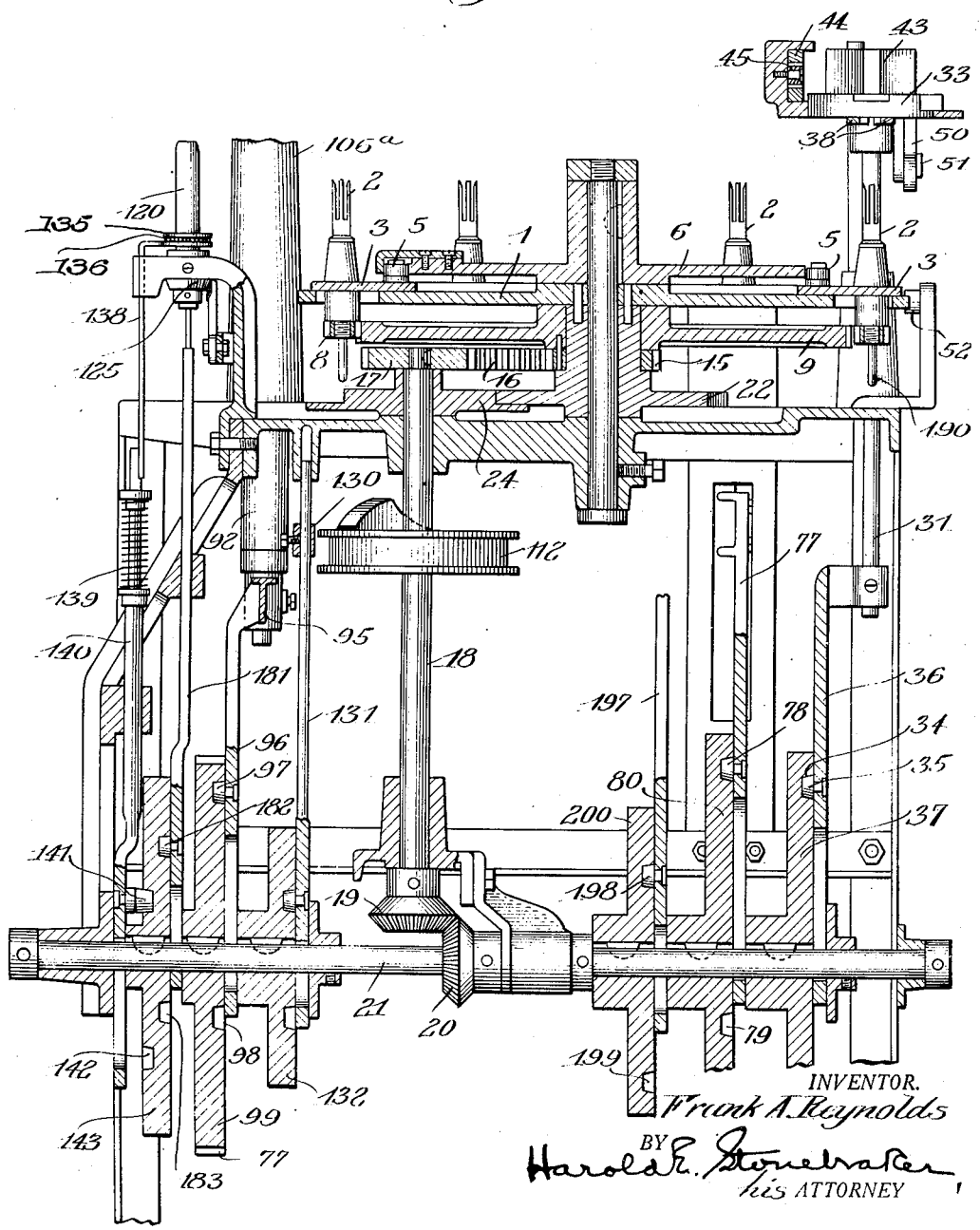
Figure 6 is a vertical sectional view on line 6—6 of Figure 1.

Referring to Figures 1 and 6, 1 designates the carrier, preferably in the form of a table rotating in a horizontal plane and provided with a series of vertically disposed apple holding devices or forks 2 arranged at uniform intervals around the table. Each fork 2 is journalled in a movable holder or plate 3, the latter being pivoted to the table at 4, while its movement toward the table is limited by an anti-friction roller or projection 5 which engages a stationary cam plate 6. 7 designates a spring actuating the holder 3 toward the cam plate 6, see Figure 25.

Figure 2:
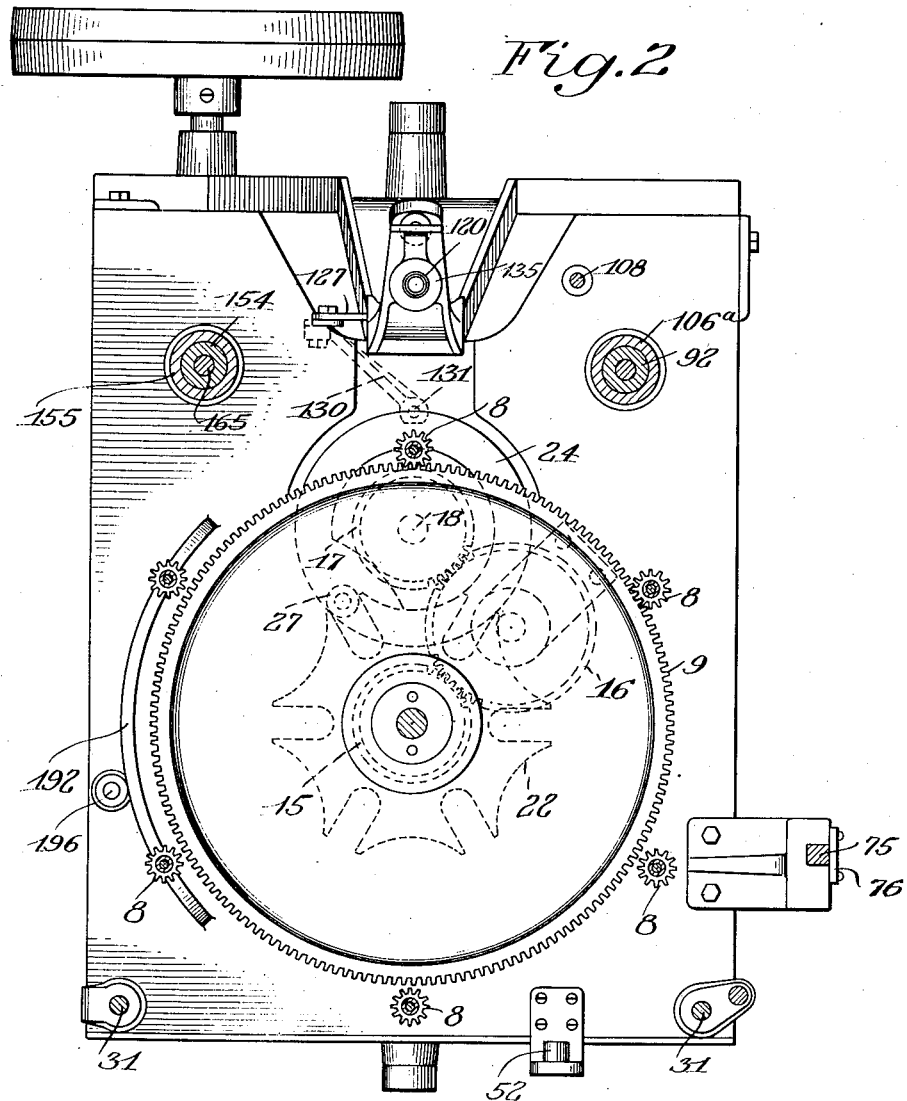
Figure 2 is a horizontal sectional view, taken in a plane immediately under the carrier table above the driving gear, and illustrating the mechanism as in Figure 1, with the upper parts of the machine removed.

Each fork 2 is mounted on an arbor provided at its lower end with a driven element or pinion 8 fixed thereon, and arranged to engage a driving gear 9, see Figure 2, when the particular fork is opposite the cutaway portion 10 of the stationary cam plate 6. The cutaway portion 10 permits the fork holder 3 to swing toward the center of the cam plate at the paring and coring stations in order to rotate the apple at such positions, this being due to the driven pinion 8 being moved into engagement with the driving gear 9, see Figures 2 and 25.

The driving gear 9, see Figure 6, has fixed thereto a pinion 15 operated by an intermediate gear 16 which in turn is actuated by pinion 17 fixed on the upper end of a shaft 18. The latter carries a bevel pinion 19 at its lower end which is engaged and driven by a bevel pinion 20 on the main driving shaft 21. In this manner, the driving gear 9 is operated continuously, to turn the apple holding forks as the latter reach the paring and coring stations, and in order to impart intermittent movement to the carrier table, to bring the forks to the respective stations successively, the carrier table has fixedly connected thereto the star wheel 22, see Figures 2 and 6, operated by the projection or roller 27 on the wheel 24, the latter being also fixedly mounted on the shaft 18 already mentioned.

With the mechanism thus far described, the carrier table turns at regular intervals, to bring each apple holding fork successively to the loading, paring and coring stations, such fork being rotated while at the paring and coring stations through the driving gear previously mentioned, and held stationary at other points in the rotary travel of the carrier table. The loading mechanism which automatically positions the apple on the carrier table will now be described.

Loading mechanism.

The loading mechanism includes a vertically movable frame, see Figures 3 to 5, and 8, including a bottom cross bar 30, vertical guide rods 31 and cross head 32, the latter having an opening 33, see Figure 8, to permit an apple to pass onto a fork on the carrier table. The loading mechanism is actuated upwardly and downwardly by a cam slot 34 engaging a projection 35 on the extension 36 of the frame, see Figure 3; the cam slot 34 being located in a disk 37 keyed on the main shaft 21 already mentioned.

The apple is supported on the loading mechanism by a platform, comprising two relatively movable portions 38, see Figures 9 and 10, which are normally held together, as in Figure 9, by a spring 39 and are forced apart to release the apple by a suitable abutment, or pin 40 located in the downward path of travel of the platform, and acting to spread the movable portions of the table when the apple reaches its fork on the carrier table. In order to properly position or center the apple with reference to its fork, I employ oppositely disposed centering members, including a pair of plates 41 slidably disposed on the cross head 32 and actuated toward the apple by springs 42. Each slidable plate 41 has an upwardly extending curved flange or wall 43, the portions 43 being arranged to engage opposite portions of the apple and thereby center the latter.

In order to insure uniform movement of the oppositely disposed centering members, each one has connected thereto an integral rack 44 engaging opposite sides of a common pinion 45, Figure 8. The centering members are normally held retracted, as shown in Figure 8, by means of a dog 46 pivoted to an ear 47 on one of the centering members and engaging an abutment 48 on the frame.

The parts are in this position when the apple is first positioned on the loading mechanism, and as the latter commences its downward travel, the dog 46 is engaged by a pivoted spring-pressed lug 49 and thereby lifted, releasing the centering members which, under the action of springs 42, move toward and engage the apple at opposite portions until the loading mechanism reaches the downward limit of its travel. Then a crank arm 50, see Figure 5, which is pivoted at 51 to the cross head, engages a stationary projection 52 lying in its path of travel, and is thereby rocked to engage the arm 53 and move the centering members back to normal position, the dog 46 riding over the abutment 48 and locking the centering members in their retracted positions. This position they occupy during the upward or return travel of the loading mechanism, the dog 46 riding past the spring-pressed lug 49 without being actuated, and the parts are then ready to receive another apple and repeat the operation.

Figure 3:
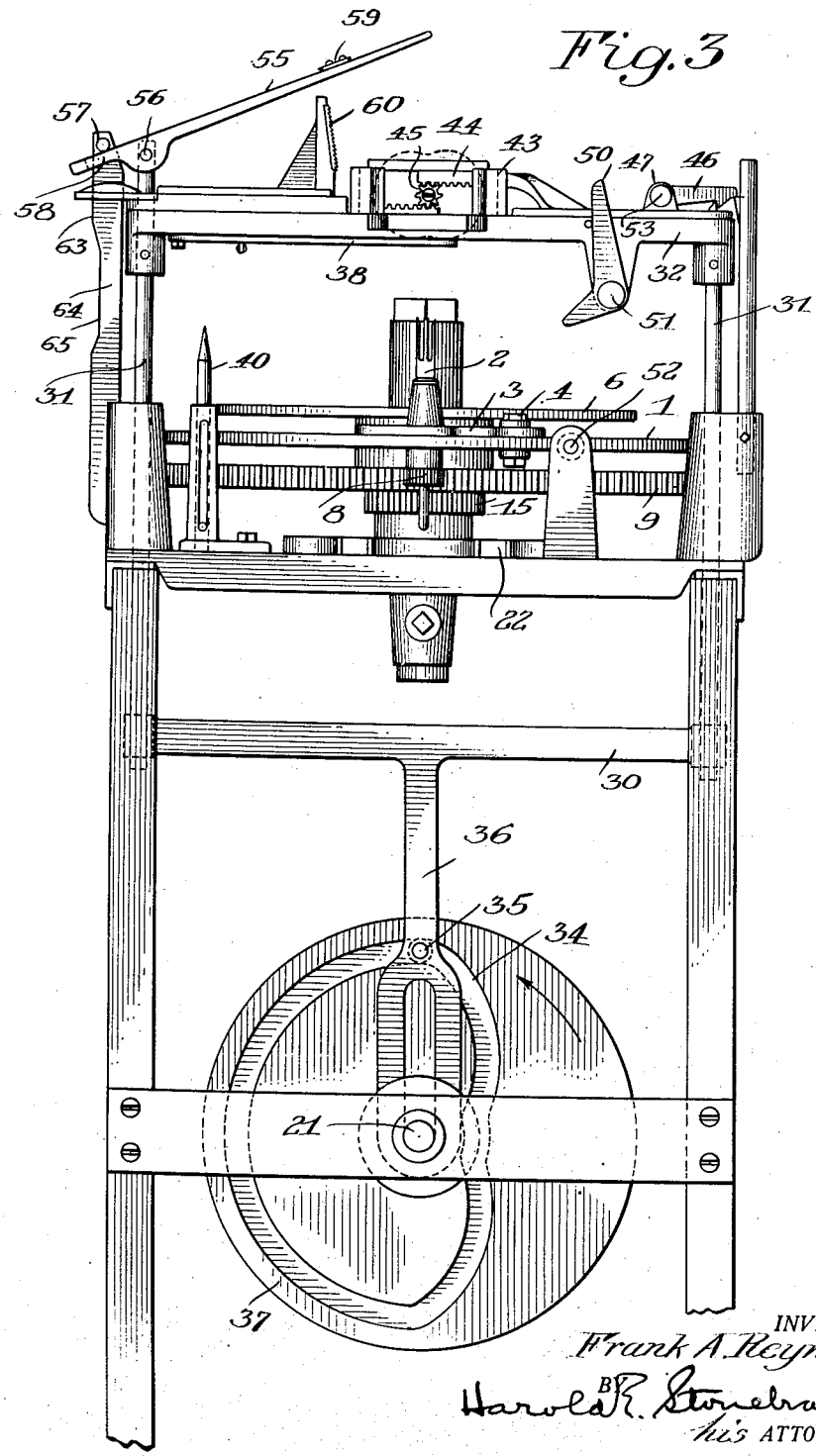
Figure 3 is an end elevation, showing the initial position of the parts of the loading mechanism.
Figure 4:
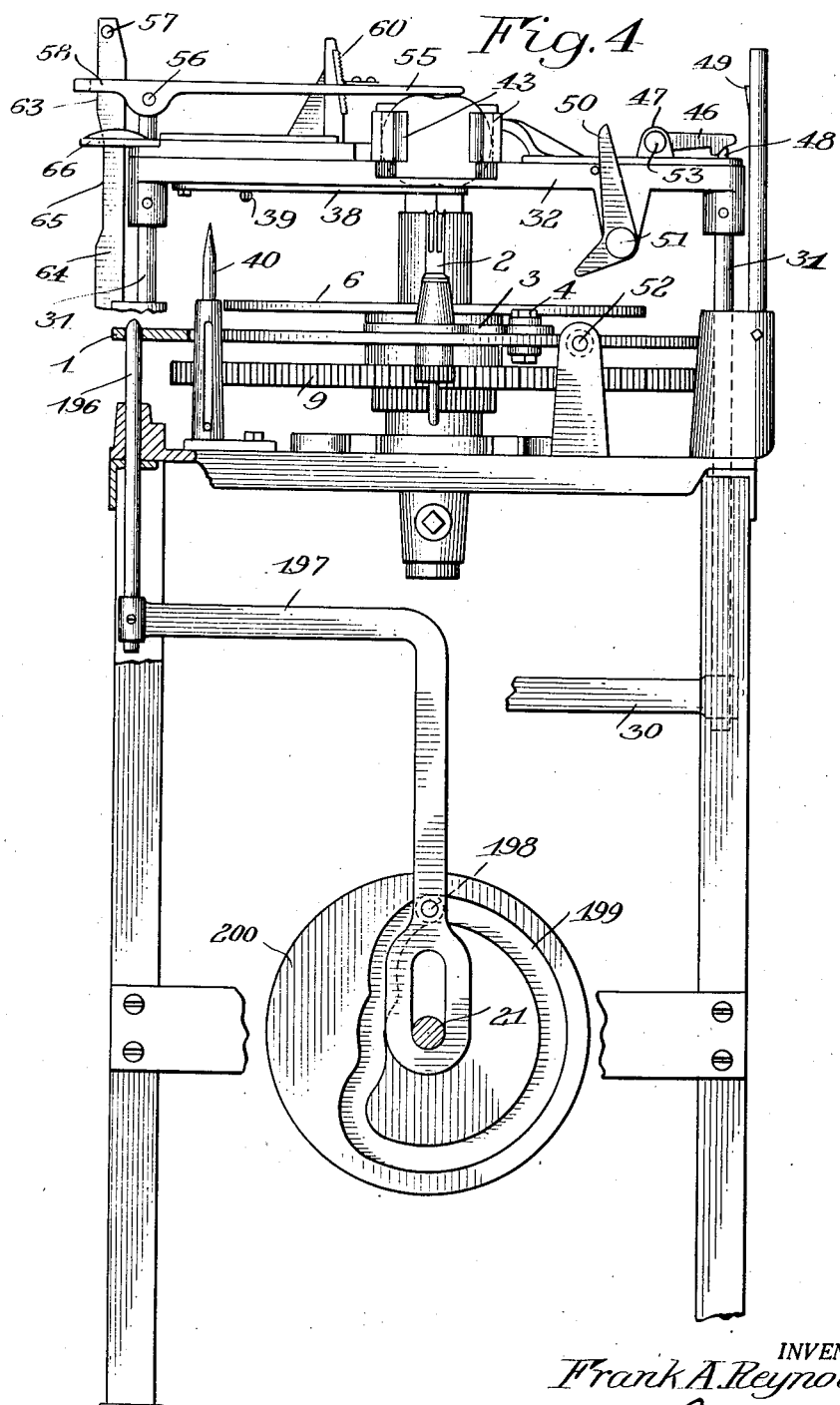
Figure 4 is a similar view, showing the position of the parts of the loading mechanism after the apple has been gripped, and before its final movement toward the carrier table.
Figure 5:
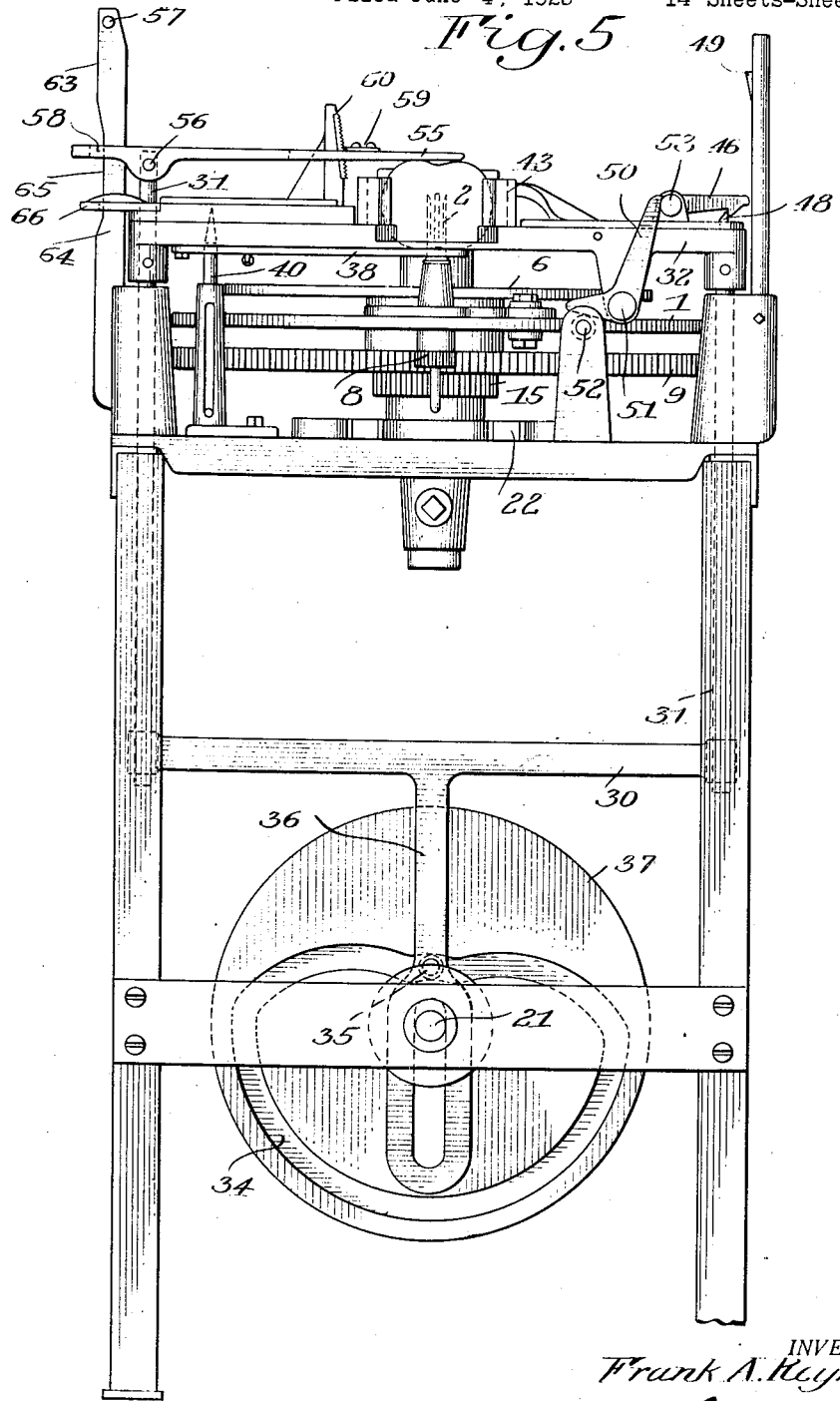
Figure 5 is a similar view, showing the position of the parts as the loading mechanism completes its downward movement toward the carrier table, placing the apple on the carrier fork.

In order to force the apple upon the fork of the carrier table, I employ a follower 55, which is pivoted at 56 to the frame of the loading mechanism, see Figure 3, and is held normally in elevated position as shown in Figure 3 by a stationary pin 57 engaging the tail piece 58 of the follower. As the loading mechanism moves downwardly, the tail piece of the follower moves away from the pin 57, permitting the follower to assume the position of Figure 5, in engagement with the top of the apple. It is then necessary to lock the follower in this position in order to force the apple upon its fork, and this is accomplished in the following manner. 59 designates a locking pawl or tooth carried by the follower 55 and arranged to engage one of a series of teeth or notches on a locking plate 60, see Figures 3 and 8. The locking plate 60 is carried by a slidable plate 61 which is actuated into locking position by a spring 62. The slidable plate 61 is mounted on the cross head 32 of the vertically movable frame and is held normally in retracted position as in Figures 3 and 8, by means of the wall 63 of the stationary post 64. The post 64 is cut away at 65, so that as the cross head 32 moves downwardly, the slidable plate 61 is released when its end 66 engages the cutaway portion 65, as shown in Figures 4 and 5, and the spring 62 then actuates the locking plate 60 toward the locking tooth 59 and retains the follower in engagement with the apple.

The parts are so timed that the follower first gravitates into engagement with the top of the apple, and is then locked by the inward movement of the plate 60, the parts remaining in this position until the apple has been forced upon its fork, after which the loading mechanism moves upwardly, the locking plate 60 is forced back to its retracted or unlocking position by the wall 63, as in Figure 8, and the follower is finally elevated, leaving the parts in normal position, and ready to receive another apple which is manually positioned on the platform, or movable portions 38, between the centering members 43, while the loading mechanism remains in its uppermost position.

Paring mechanism.

The apple, having been positioned on the carrier table in the manner just described, travels around with the carrier table, and is brought to the paring station. At such point, the table is stationary and the apple is rotated on the table by the mechanism already described, while the paring mechanism functions in the following manner.

Figure 7:
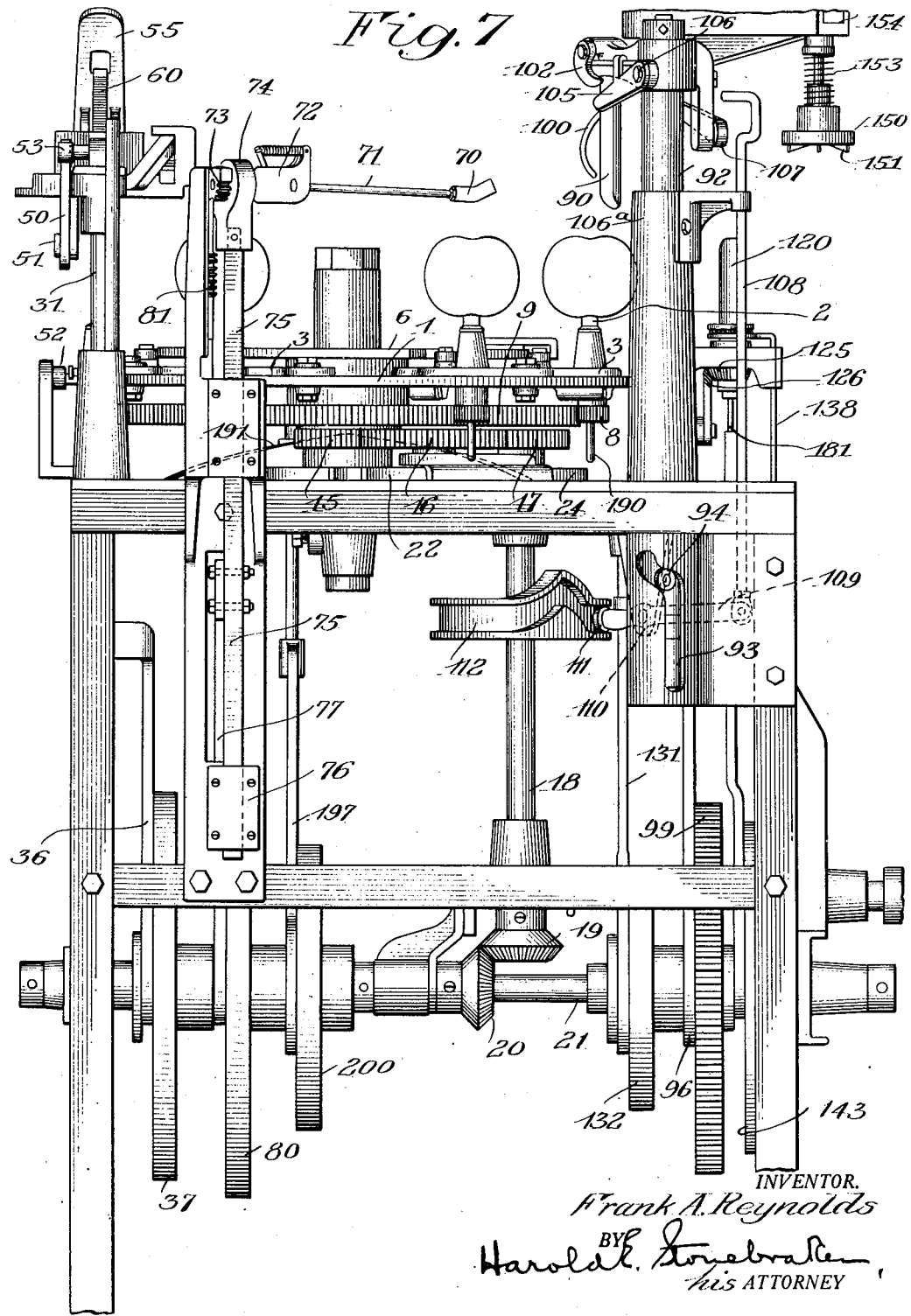
Figure 7 is a side elevation looking toward the right of Figure 1.
Figure 13:
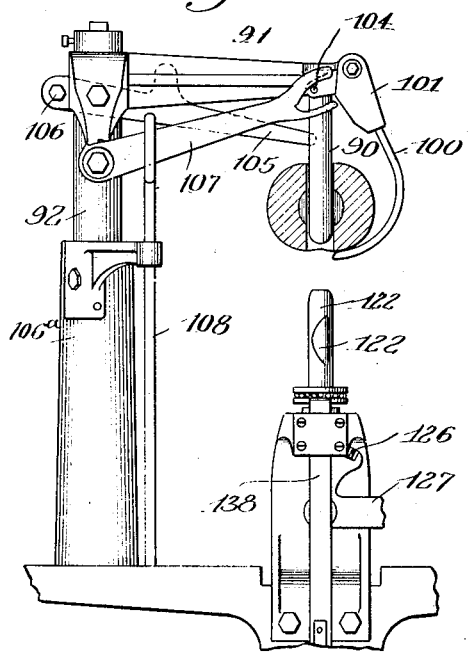
Figure 13 is a detail side elevation, showing the position of the parts as the coring knife is lowered with the apple to a position above the seed cell removing knife.

Referring to Figure 7, 70 designates a paring knife mounted on a rod 71 which is pivotally and yieldably mounted on a bracket 72. The bracket 72 has fixedly connected thereto a gear segment 73, said parts being journalled for oscillation in a head 74 carried at the upper end of a post 75 which slides in a guide 76, while 77 is a connecting rod secured to the post 75 and having a pin or projection 78 which engages and is controlled by the cam slot 79 in disk 80 on main shaft 21, see Figure 6. 81 designates a stationary rack, and the parts are so constructed and timed that when the apple reaches the paring station, and during its rotation at such station, the post 75 is moved downwardly, bringing gear segment 73 into engagement with the stationary rack 81, and thus causing a turning movement of the bracket 72 on which the paring knife is pivotally supported. In this fashion, the paring knife starts at the top of the apple and travels downwardly about the latter, which at the same time is rotated against the knife. After the apple is pared, the paring knife 70 is returned to initial position and the carrier table again rotates to bring the apple into position to be operated on by the coring mechanism, which will now be described.

*Coring mechanism.*

Referring now to Figures 7, 11 and 12, 13 and 21, 90 designates the coring knife which is mounted on an arm 91 carried by a support or post 92, that has both a reciprocating and oscillatory motion with reference to the apple support or fork, for a purpose that will appear presently. The movement of the coring knife is controlled by a cam slot 93 in a stationary plate, see Figure 7, in which travels a roller or projection 94 mounted upon the post 92, so that as the latter moves upwardly and downwardly, it is oscillated in order to swing the coring knife laterally with reference to the apple as it reaches the uppermost limit of its travel.

The coring knife support or post 92 is journalled in a frame 95, see Figure 12, which has a downwardly extending arm 96 carrying a roller or projection 97 that engages a cam slot 98 in the disk 99 keyed to the main drive shaft 21. Thus, the cam disk 99 causes upward and downward movement of the coring knife, and through the instrumentality of cam slot 93, effects a lateral movement of the coring knife as it travels upwardly. While the apple is located at the coring station, it rotates on the carrier table by the mechanism already described, and during this rotation, the coring knife 90 descends, removing the core. The coring knife then moves upwardly and laterally, carrying the apple with it, and transfers the apple from the fork on the carrier table to the seed cell removing mechanism, and I will now describe the parts which cooperate with the coring knife to remove the apple from the fork, and position it on the seed cell removing mechanism.

100 designates an apple retaining member or hook carried on a bracket 101, see Figures 12 to 14 and 21, the bracket 101 being pivoted to the arm 91 and held frictionally in any adjusted position. The bracket 101 has fixed thereto at one end an arm 102 and at its opposite end a tail piece 103 and pin 104. 105 designates a gravity lever pivoted at 106 on the post 92. As the post 92 reaches the limit of its downward travel, lever 105 engages the top of the stationary standard 106, and rocks from the position shown in Figure 7 to the position shown in Figure 12, causing the hook 100 to engage under the apple. The hook 100 remains in this position during the upward travel of the coring knife, retaining the apple thereon until it is ready to be received on the seed cell removing mechanism. The coring knife 90 moves upwardly with the apple thereon, and is then swung laterally with reference to the carrier table until it assumes the position illustrated in Figure 13, immediately over the seed cell removing knife. When the parts have assumed this position, a lever 107 engages pin 104 and swings the apple retaining member from the position shown in Figure 13 to the position shown in Figure 14, releasing the apple which thereupon falls onto the tubular member of the seed cell removing mechanism which will be presently described. The lever 107 is pivoted on the post 92 and is actuated by a rod 108, see Figure 7, the latter being pivotally connected to the outer end of an arm 109 which is pivoted on a bracket 110 and carries at its opposite end a roller or projection 111 engaging a cam 112, mounted on the before mentioned shaft 18. In this manner, the apple is automatically released and the coring knife returns to cooperate with another apple, and I will now describe the mechanism by which the seed cells are removed.

*Seed cell removing mechanism.*

Figure 15:
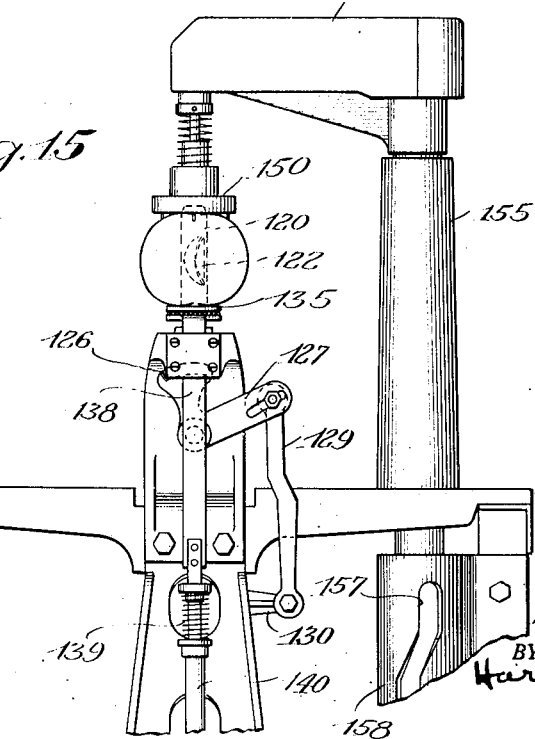
Figure 15 is a side elevation illustrating the parts of the seed cell removing mechanism when cooperating with an apple.

The seed cell removing mechanism includes a stationary tubular supporting member 120 having an opening 121 within which is arranged the seed cell removing knife 122, see Figures 21 and 22. The knife 122 is preferably shaped to conform generally to the opening in the tubular member when in normal position, and is mounted so as to oscillate about an axis parallel to the rotary axis of the apple, to move into cutting position while the apple is rotating. The knife may be arranged and controlled in a variety of ways, and in the embodiment herein disclosed, it is illustrated as carried by a rod pivotally mounted in the tubular member 120 and having an arm or angular extension 123 at its lower end, see Figures 17 to 19, which is engaged and operated by the oscillatory actuating device or sleeve 124. The latter is provided with a series of teeth 125 engaged by a gear segment 126 on the rocker arm 127 which is pivoted at 128, see Figures 11 and 21, and has connected thereto a rod 129, Figures 11 and 15, the latter being operated by an arm 130, see Figures 2 and 6, which is fixed on a rod 131, actuated by a cam slot in cam disk 132. By this means the cell removing knife 122 is actuated from the position illustrated in Figure 18 to that shown in Figures 19 and 21, and while in such operative position, the apple is rotated by means that will now be described.

The means for supporting and rotating the apple includes a rotary table 135 arranged on ball bearings 136 upon a platform 137 mounted at the upper end of a rod 138 which is yieldably supported through a spring 139 on a tubular rod 140. The latter is provided with a pin or projection 141, see Figures 6 and 11, which engages and is controlled by a cam slot 142 in disk 143 on the main shaft 21. This mechanism permits the apple to be supported on a yieldable, rotary table, while at the same time it is engaged and rotated by the following instrumentalities.

Figure 14:
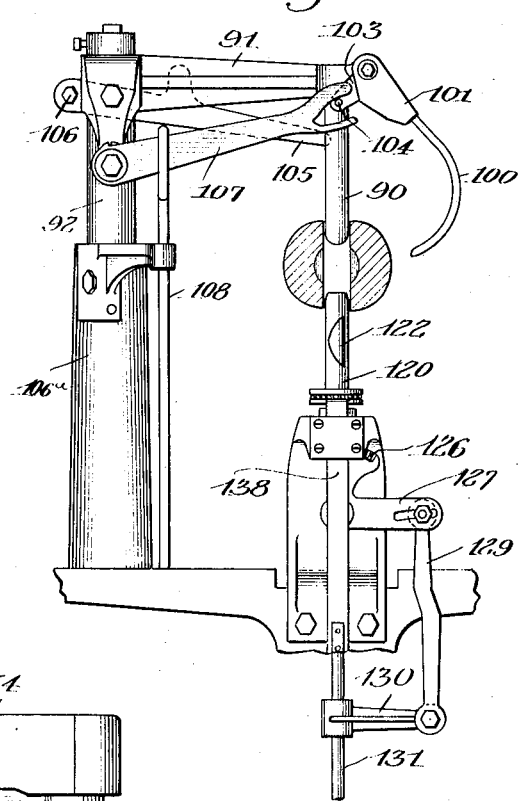
Figure 14 is a similar view, showing the position of the parts as the apple is released, and permitted to gravitate onto the supporting means where the seed cells are removed.

Referring to Figures 21 and 23, 150 designates a head having a series of radially arranged knives 151 for gripping the apple, the head being yieldably arranged on an arbor 152 through a spring 153. The head and arbor are mounted on a supporting member or housing 154 which has a vertically reciprocating as well as an oscillating motion in the pedestal 155, see Figure 11. To accomplish this, the supporting member 154 has a projection or roller 156 engaging a cam slot 157 in a stationary housing 158, the supporting member 154 being reciprocated by the frame 95 already described, see Figure 12, and upon which the supporting member is mounted. Normally, the head 150 is out of alinement with the tubular member 120, and immediately after an apple has been positioned upon said tubular member, as illustrated in Figure 14, the supporting member 154 is oscillated about its vertical axis to bring the head 150 above the tubular member 120, whereupon the supporting member moves downwardly with the frame 95, Figure 12, until the rotary head 150 engages and grips the apple, as in Figures 15 and 21.

The apple is then rotated upon the table 135 by means of the head 150 in the following manner. The head 150 is splined on the arbor 152 which carries at its upper end a bevel pinion 160 engaged and operated by a corresponding pinion 161 on the shaft 162. The latter carries at its outer end a bevel pinion 163 that is engaged and driven by bevel gear 164, see Figure 23, at the upper end of a vertical shaft 165. Shaft 165 carries a bevel pinion 166 which is stationary while the supporting member 154 is in its upper position but is rotated when said supporting member is lowered and the head 150 grips the apple.

This is accomplished by the bevel gear 167, Figure 24, which is located so as to engage bevel pinion 166 when the latter reaches the limit of its downward travel, see Figure 12. Bevel gear 167 is fixed on an arbor 168 and has keyed thereto a gear 169 which is engaged and operated by gear teeth 170 on the periphery of cam disk 99, see Figure 12. With the mechanism just described, after the apple is placed on the rotary table, the seed cell removing knife is moved to its operative position while the gripping head 150 is brought down into engagement with the apple and positively rotates it against the cell removing knife, which is held stationary during the cell removing operation. By reason of having both the table 135 and the head 150 yieldably mounted or spring-controlled, and engaging the apple at opposite portions, or at its top and bottom, it is possible to accurately center the apple with reference to the cell removing knife, and this centering of the apple takes place automatically, irrespective of the size of the apple, because, whether the apple be large or small, the supporting table and gripping head will cooperate at equal distances from the center or seed cell zone of the apple.

Figure 16:
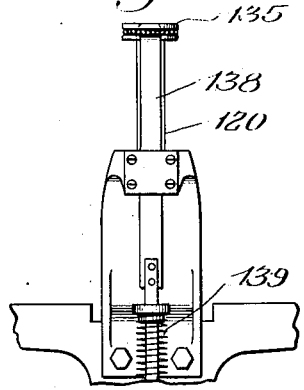
Figure 16 is a detail view illustrating the table on which the apple rests while the seed cells are removed, and showing the table in its elevated position to discharge the apple.

After the seed cell removing operation is completed, the rotary gripping head is again moved upwardly and laterally away from the tubular member. During the upward travel of the gripping head, the table 135 is likewise moved upwardly to the position illustrated in Figure 16, carrying the apple to a point above the tubular member 120, and the lateral movement of the gripping head causes the apple to be discharged from the machine. In order to effect the necessary upward travel of the table 135, the tubular member 140 which controls the table, is operated vertically by the cam slot 142 already referred to, see Figure 6. The mechanism will now be described which functions to eject the seed cell mass from the tubular member 120 after it is removed from the apple.

Referring to Figures 21 and 22, the ejecting mechanism preferably comprises a plunger 180 which normally occupies a position above the cell removing knife 122, and at the top of the tubular member 120, as shown in Figure 22, and is automatically moved downwardly to the position shown in Figure 22 after the cell removing operation is completed, thus causing the cell mass removed from the apple to be pushed toward the discharge end of the tubular member, and leaving the space opposite the knife 122 unobstructed for another cell removing operation.

The plunger 180 is returned to its normal or uppermost position before the parts are ready for the next operation of the cell removing knife. To accomplish these movements of the ejecting plunger, the latter is mounted at the upper end of a rod 181 which extends downwardly through the tubular member 120, and carries a pin or projection 182 engaging a camway 183 in the disk 143 already referred to, see Figure 6.

Core removing mechanism.

After an apple has been removed from its supporting fork at the coring station, it is necessary to remove the core from the fork before the latter comes around again to the loading station. To accomplish this, each fork holder, see Figure 26, is provided with a plunger 190 which is shown in its normal position, and has its lower end terminating at a distance beneath the lower end of the fork holder, whereby the plunger can be elevated so that its upper end will engage and eject the core from the fork. This is accomplished by a stationary cam surface 191, see Figures 2 and 7, over which the plungers 190 ride successively and are elevated. By the time each fork reaches the stationary arm 192, see Figure 1, the plunger 190 is at its highest point, with the core at the top of the fork and further movement of the carrier table causes the core to be pushed off the fork by the arm 192.

Locking mechanism for the carrier table.

It is important that the carrier table be held fixedly when stopped, so that the apple will remain stationary during the paring and coring operations, and this is brought about by any suitable locking mechanism that functions automatically each time the carrier table is brought to a standstill. One practical means for doing this is illustrated in Figures 1 and 4, the carrier table being provided with a series of openings 195, one for each fork, and 196 is a reciprocating plunger that is moved upwardly as the carrier table stops and engages the opening 195 that is above the plunger. At a predetermined moment, the plunger 196 is lowered, unlocking the carrier table, which is then ready for its next intermittent travel. The plunger 196 is mounted on a support 197, which carries a roller 198 engaging a camway 199 in the disk 200, fixed on the main drive shaft 121, and controlling the operation of the locking plunger 196.

Operation.

The operation briefly is as follows:

With the parts in the position illustrated in Figures 1, 3 and 8, an apple is positioned on the platform consisting of the separable portions 38. The loading mechanism then moves downwardly toward the carrier table, the apple being centered by the centering members 41 and engaged by the follower 55. When it reaches the fork immediately thereunder on the carrier table, it is forced thereon by the follower 55, being held in proper relative position by the centering walls 43, and as the loading mechanism reaches the limit of its downward travel, the separable portions 38 are spread apart to clear the apple, and the loading mechanism returns upwardly, leaving the apple on its fork. During the upward travel of the loading mechanism, the centering members are retracted, the movable portions of the platform are again brought together and finally the follower is elevated and the parts are ready to receive another apple.

The carrier table rotates intermittently, and an apple can be placed on the loading mechanism each time the table is stopped. While the table is being loaded in the manner just described, the paring and coring mechanisms are functioning at their respective stations, operating on apples which have previously been positioned on the table. When the apple reaches the paring station, it is rotated in proper relation to the paring knife and is completely pared. The apple then moves on to the coring station, where it is again rotated, and the coring knife lowered. As the coring knife rises, the apple is carried with it and removed at this point from the carrier table. The fork on which the apple was held travels on with the carrier table, the core removed therefrom, and the fork thus made ready to receive another apple when it reaches the loading station.

The apple meanwhile is removed by the coring knife to the seed cell removing mechanism, where the apple is accurately centered with reference to the cell removing knife, and rotated while the knife is moved into proper position to engage the seed cell portion. The latter is thus removed from the apple and discharged through the tubular supporting member, after which the apple is elevated and ejected from the machine.

While I have described the various features of my invention with reference to a particular construction, the improvements and principles embodied therein are not limited in their application to the structural details herein set forth, and this application is intended to cover any modifications or departures from the mechanism shown that will accomplish the same results, or that come within the intent of the invention, or the scope of the following claims.

I claim:

1. The combination with an intermittently rotating carrier provided with a series of apple holding devices, of paring and coring stations, seed cell removing mechanism, means acting automatically to pare and core an apple at said stations successively between intermittent movements of the carrier, and automatic means acting to transfer an apple from the carrier to the seed cell removing mechanism.

2. The combination with apple coring mechanism, of seed cell removing mechanism, and means acting automatically to transfer an apple from the coring mechanism to the seed cell removing mechanism.

3. The combination with an intermittently moving carrier provided with a series of apple holding devices, of paring and coring stations, seed cell removing mechanism, means acting automatically to pare and core an apple at said stations successively between intermittent movements of the carrier, and automatic means acting to transfer an apple from the carrier to the seed cell removing mechanism.

4. The combination with an intermittently moving carrier provided with a series of apple holding devices, of seed cell removing mechanism, and means acting automatically to transfer an apple from the carrier to the seed cell removing mechanism.

5. The combination with a carrier rotating intermittently in a horizontal plane and provided with a series of vertically disposed apple holding devices, of paring and coring stations, seed cell removing mechanism, means acting automatically to pare and core an apple at said stations between intermittent movements of the carrier, and means acting automatically to transfer an apple from the carrier to the seed cell removing mechanism.

6. The combination with an intermittently rotating carrier, of loading, paring and coring stations, seed cell removing mechanism, means acting automatically to position an apple on the carrier at the loading station and to successively pare and core the apple at such stations between intermittent movements of the carrier, and means acting automatically to transfer the apple from the carrier to said seed cell removing mechanism.

7. The combination with a carrier rotating intermittently in a horizontal plane and having a series of vertically disposed apple holding devices, of loading, paring and coring stations, seed cell removing mechanism, means acting automatically to position an apple on the carrier at the loading station and to successively pare and core the apple at such stations between intermittent movements of the carrier, and means acting automatically to transfer the apple from the carrier to the seed cell removing mechanism.

8. The combination with an intermittently moving carrier, of means for automatically positioning an apple on the carrier comprising a vertically movable platform upon which the bottom of the apple rests as it is lowered, and a follower engaging the top of the apple.

9. The combination with an intermittently moving carrier, of means for automatically positioning an apple on the carrier comprising a vertically movable platform upon which the bottom of the apple rests as it is lowered, a follower engaging the top of the apple, and a plurality of centering members engaging the apple at opposite sides thereof.

10. The combination with an intermittently moving carrier, of means for automatically positioning an apple on the carrier comprising a vertically movable platform upon which the bottom of the apple rests as it is lowered, a follower engaging the top of the apple, and a plurality of spring-actuated centering members engaging the apple at opposite sides thereof.

11. The combination with a movable carrier, of means for automatically positioning an apple on the carrier comprising a vertically movable frame, a platform on the frame for supporting the bottom of an apple, a follower movably mounted on the frame, and means for locking the follower in engagement with the apple as the frame approaches said carrier.

12. The combination with a carrier, of means for automatically positioning an apple on the carrier comprising a platform for supporting the bottom of an apple, a follower engaging the top of the apple, and means acting automatically to move said platform from under the apple as the latter approaches the carrier.

13. The combination with a carrier, of means for automatically positioning an apple on the carrier comprising a platform composed of a plurality of movable portions, a follower engaging the top of an apple, and means acting automatically to separate said movable portions of the platform and release the apple as the latter approaches the carrier.

14. The combination with a carrier, of means for automatically positioning an apple on the carrier comprising a frame movable toward and from the carrier, a platform carried by the frame for supporting the bottom of an apple, a pair of oppositely disposed centering plates movably arranged on the frame, each of said plates having a wall or flange arranged to engage a side of the apple, and means whereby the plates operate yieldably to center an apple.

15. The combination with a carrier, of means for automatically positioning an apple on the carrier comprising a platform supporting the bottom of the apple, a plurality of spring actuated centering members engaging the apple at opposite sides thereof, means for normally holding said centering members retracted and automatically releasing them to engage an apple at a predetermined point as said frame approaches the carrier.

16. The combination with a carrier, of means for automatically positioning an apple on the carrier comprising a platform upon which the bottom of the apple rests, and a follower engaging the top of the apple, the follower being normally out of operative position and automatically actuated to engage the top of the apple as the platform approaches the carrier.

17. The combination with a carrier, of means for automatically positioning an apple on the carrier comprising a platform upon which the bottom of the apple rests, a follower engaging the top of the apple, said follower being normally out of operative position and automatically actuated to engage the top of the apple as said platform approaches the carrier, and a locking device which is retracted when the follower is in inoperative position and is released to engage and lock the follower automatically when the latter has engaged the apple.

18. The combination with a carrier, of means for automatically positioning an apple on the carrier comprising a platform movable toward and from the carrier and consisting of a pair of pivotally mounted separable portions normally located under an apple, and a stationary member which cooperates with said portions as they travel toward the carrier to separate them and permit the apple to move therebetween and be positioned on the carrier.

19. The combination with an intermittently rotating carrier having a series of rotary apple supporting forks thereon, of loading, paring and coring stations, means acting automatically to rotate each fork during the interval that it is positioned at the paring and coring stations, and to hold said forks stationary except when positioned at said stations.

20. The combination with an intermittently rotating carrier having a series of apple retaining forks thereon, each of said forks being provided with a driven pinion, of loading, paring and coring stations, and a driving gear cooperating with said pinions to rotate the same at the paring and coring stations, the driven pinions being movable to engage the driving gear at the paring and coring stations and to disengage it at other times.

21. The combination with a carrier table rotating in a horizontal plane, of seed cell removing mechanism, and means for automatically transferring an apple from the carrier table to the seed cell removing mechanism.

22. The combination with a carrier table rotating in a horizontal plane, of paring mechanism and coring mechanism cooperating with an apple on the table, seed cell removing mechanism, and means for automatically transferring an apple from the carrier table to the seed cell removing mechanism.

23. The combination with an apple support, of a coring knife, seed cell removing mechanism, and means cooperating with the coring knife and acting to remove an apple from said support and transfer it to the seed cell removing mechanism.

24. The combination with an apple support, of a coring knife having both a reciprocatory and lateral movement with reference to said support, seed cell removing mechanism, and means for retaining an apple on the coring knife as it is elevated whereby the apple is removed from the support and transferred to the seed cell removing mechanism.

25. The combination with an apple support, of a coring knife, seed cell removing mechanism, means for actuating the coring knife upwardly away from the apple support, laterally, and downwardly toward the seed cell removing mechanism, and devices for retaining an apple on the coring knife for transferring the same after it is cored to the seed cell removing mechanism.

26. The combination with an apple support, of a coring knife, seed cell removing mechanism, a coring knife support that has a reciprocating and oscillatory motion to bring the coring knife in alinement successively with said apple support and the seed cell removing mechanism, means for engaging an apple to retain it on the coring knife as the latter is elevated, and for automatically releasing the apple to permit it to gravitate downwardly from the coring knife when the latter has reached its position over the seed cell removing mechanism.

27. The combination with an apple support, of a coring knife, seed cell removing mechanism, a coring knife support which has a reciprocatory and oscillatory movement to move the coring knife from a point above said apple support to a point above the seed cell removing mechanism, and a retaining member which engages an apple to hold it on the coring knife as the latter is elevated and moves away from the latter to release the latter as the coring knife reaches a position above the seed cell removing mechanism.

28. The combination with means for supporting and rotating an apple, of a seed cell removing knife that is held stationary within the apple during the seed cell removing operation.

29. The combination with means for supporting and rotating an apple, of seed cell removing mechanism comprising a knife having oscillatory movement into and out of cutting position about an axis parallel to the axis of rotation of the apple, said knife remaining stationary during the cell removing operation.

30. The combination with means for supporting and rotating an apple, of seed cell removing mechanism comprising a stationary supporting member adapted to occupy a position within an apple, and a seed cell removing knife mounted in said supporting member and movable thereon into and out of cutting position.

31. The combination with means for supporting and rotating an apple, of seed cell removing mechanism comprising a stationary tubular supporting member adapted to be positioned within an apple, and a cell removing knife normally conforming to the periphery of the tubular supporting member, and having an oscillating motion whereby it swings outwardly away from said supporting member during the celling operation.

32. The combination with a stationary supporting member and a seed cell removing knife mounted therein, of apple supporting means including a rotary table, and a rotating head which grips and rotates the apple.

33. The combination with a stationary supporting member and a seed cell removing knife mounted therein, of apple supporting means including a rotary table, and a rotating head having a series of radial serrations whereby it grips and rotates the apple.

34. The combination with a stationary supporting member and a seed cell removing knife mounted therein, of apple supporting means including a rotary table, and a spring actuated rotating head which grips and rotates the apple.

35. The combination with a coring knife, means for retaining an apple on the coring knife, seed cell removing mechanism including a stationary tubular supporting member, devices for automatically moving said coring knife to a position above said supporting member and permitting an apple to gravitate from the coring knife onto the supporting member, devices for rotating an apple, a seed cell removing knife movably arranged in the supporting member, and mechanism for automatically operating the cell removing knife into operating position during rotation of the apple.

36. The combination with means for supporting and rotating an apple, of seed cell removing mechanism comprising a stationary tubular supporting member having an opening in its periphery, a cell removing knife pivoted in the supporting member and normally occupying a position in said opening conforming to the periphery of the supporting member, and mechanism operating automatically to move the cell removing knife outwardly away from said supporting member and hold it stationarily in cutting position during rotation of the apple.

37. The combination with a seed cell removing knife arranged for cooperation with the central portion of an apple, of means for centering an apple with reference thereto comprising devices engaging the apple at top and bottom and both yieldable with reference to the cell removing knife.

38. The combination with a seed cell removing knife arranged for cooperation with the central portion of an apple, of means for supporting and centering an apple with reference thereto comprising a yieldable table on which the apple is supported, and a yieldable head engaging the apple at a point opposite to the table.

39. The combination with a seed cell removing knife arranged for cooperation with the central portion of an apple, of means for supporting and centering an apple with reference thereto comprising a yieldable table on which the apple is supported, and a yieldable rotating head engaging the apple at a point opposite to the table.

40. The combination with a seed cell removing knife arranged for cooperation with the central portion of an apple, of means for supporting and centering an apple with reference thereto comprising a yieldable table on which the apple is supported, and a yieldable rotating head engaging the apple at a point opposite to the table and having means for gripping and thereby rotating the apple.

41. The combination with a seed cell removing knife, of means for centering an apple with reference thereto comprising yieldable spring-actuated devices engaging the apple at opposite portions with reference to the knife.

42. The combination with a seed cell removing knife, of means for centering an apple with reference thereto comprising yieldable spring-actuated devices engaging the apple at opposite portions, and means for rotating one of said devices.

43. The combination with a seed cell removing knife that is stationary during the cell removing operation, of a yieldably mounted table on which an apple is supported, a yieldable head engaging the apple at a point opposite to said table, and means for rotating the head.

44. The combination with a seed cell removing knife adapted to be arranged within an apple and having an oscillating movement to and from operating position about an axis parallel to the axis of rotation of the apple, of a yieldably supported table on which an apple is arranged, a yieldable head engaging the apple at a point opposite to said table, and means for rotating the head.

45. The combination with a stationary tubular supporting member, of a seed cell removing knife mounted therein and movable outwardly with reference to the supporting member to operative position, an apple table, a head engaging the apple at a point opposite to said table, and means for automatically elevating the table and head until the apple is above the top of the supporting member.

46. The combination with a stationary supporting member, of a seed cell removing knife pivotally mounted therein, an oscillatory element, and operative connections between said oscillatory element and the cell removing knife whereby the latter is moved into and out of operative positions with reference to the apple by means of the turning of said element.

47. The combination with a tubular supporting member, a seed cell removing knife mounted in said supporting member, an arm fixedly connected to said knife, and an oscillatory actuating device having engagement with said arm whereby to move the knife into and out of operative position with reference to the supporting member.

48. The combination with a seed cell removing knife positionable within an apple, of yieldable devices engaging an apple at opposite portions and acting to center it relatively to the knife.

49. The combination with oppositely disposed, yieldable apple engaging devices and means for rotating one of them, of a seed cell removing knife positionable within an apple and held stationary during rotation of the apple.

50. The combination with oppositely disposed, yieldable apple engaging devices and means for rotating one of them, of a tubular member positionable within an apple, and a seed cell removing knife movably mounted in the tubular member and held stationary during rotation of the apple.

51. The combination with oppositely disposed, yieldable apple engaging devices and means for rotating one of them, of a tubular member positionable within an apple, a seed cell removing knife movably mounted in the tubular member and held stationary during rotation of the apple, an oscillatory actuating device, and connections between said actuating device and the cell removing knife whereby the latter is moved into and out of operative position with reference to the apple.

52. The combination with a tubular member, of a seed cell removing knife, and means acting automatically to eject from the tubular member the mass removed from an apple by said knife.

53. The combination with a tubular member, of a seed cell removing knife, and a plunger movable in said tubular member to eject the mass removed from an apple by said knife.

54. The combination with a tubular member, of a seed cell removing knife, a plunger movable in said supporting member to eject the mass removed from an apple by said knife, and means acting automatically to move said plunger after the seed cell removing operation is completed.

55. The combination with a tubular member, of a seed cell removing knife, a plunger movable in said supporting member to eject therefrom the mass removed from an apple by said knife, said plunger occupying a position above the knife during the seed cell removing operation and having movement downwardly after the seed cell removing operation is completed.

56. The combination with a tubular member having an opening therein, of a seed cell removing knife mounted in the tubular member within said opening and normally conforming to the periphery of the tubular member, means for swinging the knife outwardly during the seed cell removing operation, and a plunger movable within the tubular member, said plunger occupying a position above the knife while the latter is cutting and having movement downwardly after the knife is restored to normal position to eject the mass removed from the apple.

57. The combination with a seed cell removing knife positionable within an apple and movable into and out of operative positions with reference to the apple, of ejecting mechanism operating to discharge the mass removed by said knife.

58. The combination with a tubular member, of a seed cell removing knife operating to force the seed cells from an apple into said tubular member, and ejecting mechanism operating to discharge said mass from the tubular member.

59. The combination with a tubular member, apple supporting and rotating means, a seed cell removing knife operating during rotation of an apple to force the seed cells into the tubular member, and ejecting mechanism operating to discharge said mass from the tubular member.

60. The combination with a tubular member adapted to receive an apple and a seed cell removing knife cooperating with an apple when on the tubular member, of a coring knife, means for holding an apple engaged on the coring knife, a head for engaging the apple when located on said tubular member, and means acting automatically to position the coring knife and head alternately in alinement with the tubular member.

61. The combination with a tubular member adapted to receive an apple and a seed cell removing knife cooperating with an apple when on the tubular member, of a coring knife, means for holding an apple engaged on the coring knife, a rotating head for engaging and rotating the apple on said tubular member, and means acting automatically to bring the coring knife and head alternately into cooperative relationship with the tubular member.

62. The combination with means for supporting and rotating an apple, of a seed cell removing knife pivoted to swing about an axis parallel to the axis of rotation of the apple, and means for swinging the knife about its axis to engage and remove the seed cells as the apple rotates.

63. The combination with means for supporting and rotating an apple, of a seed cell removing knife movable to engage the seed cells of an apple, and means for operating said knife to operative position to remove the seed cells as the apple rotates.

64. The combination with an apple coring knife and supporting means therefor movable toward and from an apple support, of a device carried by the supporting means and operable to engage and retain the apple on the knife.

65. The combination with an apple coring knife and supporting means therefor movable toward and from an apple support, of a pivotally mounted hook device carried by the supporting means and engageable under an apple to retain it on the knife as the latter travels away from the apple support.

66. The combination with a paring mechanism, a supporting device on which the fruit is pared by the paring mechanism, a seed cell removing device, and means for removing the fruit from the supporting device and presenting the same to the seed cell removing device.

67. The combination with a paring mechanism, a supporting device on which the fruit is pared by the paring mechanism, and a coring means for coring the fruit on the supporting device, of a seed cell removing device and mechanism for removing the fruit from the supporting device and presenting it properly centered to the seed cell removing device.

68. The combination with a movable means having a plurality of supporting devices thereon for fruit, of a seed cell removing means, and mechanical means for removing the fruit from the supporting devices and presenting such fruit to the seed cell removing means to permit the seed cells to be removed from the fruit, while it is held by said mechanical means.

69. A seed cell removing apparatus comprising a seed cell removing device, mechanical means for grasping the exterior of the fruit and holding it in centered relation to the seed cell removing device, and means for turning one of the said elements so that the seed cell removing device removes the seed cell while it is held in centered relation to such device by the mechanical means.

70. The combination with a seed cell removing knife, movable inwardly and outwardly with reference to the longitudinal axis of the core of an apple, of mechanism for holding an apple in cooperative relation with the seed cell removing device during such seed celling, said mechanism having provision for centering different sized apples with reference to the top and the bottom of an apple, so that the knife will operate to remove the seed cell at the center of the apple.

71. The combination with a seed cell removing knife movable inwardly and outwardly with reference to the longitudinal axis of a core of an apple, of mechanism for holding an apple in cooperative relation with the seed cell removing device during the removal of a seed cell, said mechanism having means for holding an apple centered with reference to the longitudinal axis of the core and also centered with reference to the middle of said axis.

72. The combination with a seed cell removing knife movable inwardly and outwardly with reference to the longitudinal axis of a core of an apple, of mechanism for holding an apple in cooperative relation with the seed cell removing device during the removal of a seed cell, said mechanism having means for holding an apple centered with reference to the longitudinal axis of the core and also centered with reference to the middle of said axis, and means for effecting the relative turning movement between the knife and an apple held by said holding mechanism.

73. The combination with a seed cell removing knife, of mechanism for holding an apple during the seed celling operation said mechanism having means for centering an apple with reference to the middle of the longitudinal axis of the core of the apple, and comprising yieldable spring actuated devices engaging the apple at opposite portions thereof.

74. The combination with a seed cell removing device movable in and out with reference to the core of an apple, of mechanism for holding an apple in cooperative relation with reference to the seed cell removing device during said seed celling operation, said mechanism having provision for centering differing sized apples with reference to the top and the bottom of an apple so that the mechanism will operate to remove the seed cell at the center of the apple, and mechanism for effecting the movement of the knife outwardly after the apple has been centered with reference to the seed cell removing device.

75. In combination with a paring mechanism, a supporting device on which the fruit is pared by the paring mechanism, a coring mechanism for coring the fruit on the supporting device, a seed cell removing device, and mechanism for transferring the cored fruit from the supporting device to the seed cell removing device, said mechanism having means associated therewith for holding an apple centered with reference to the middle of the longitudinal axis of the core.

In witness whereof, I have hereunto signed my name.

FRANK A. REYNOLDS.